Oct. 27, 1964

C. E. HENDRIX ETAL
CONTROL SYSTEM FOR AUTOMATIC SOFT
LANDING OF A ROCKET VEHICLE 3,154,265

Filed April 19, 1962

INVENTORS.
CHARLES E. HENDRIX
PAUL C. DRIVER
DONALD D. STEVENSON
BY

*P. H. Firsht*

ATTORNEY.

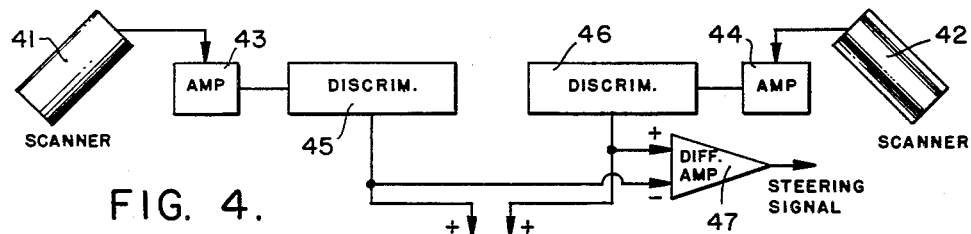
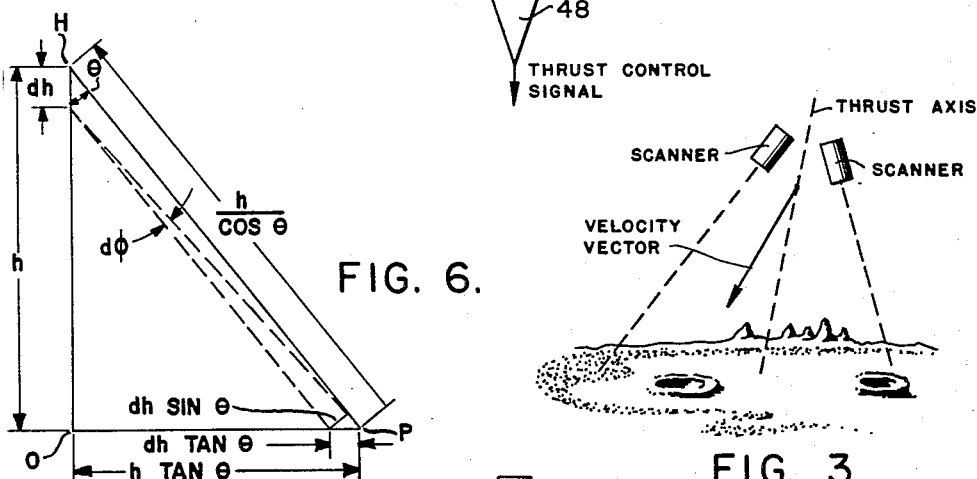
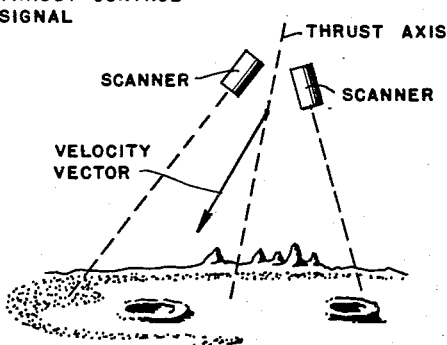
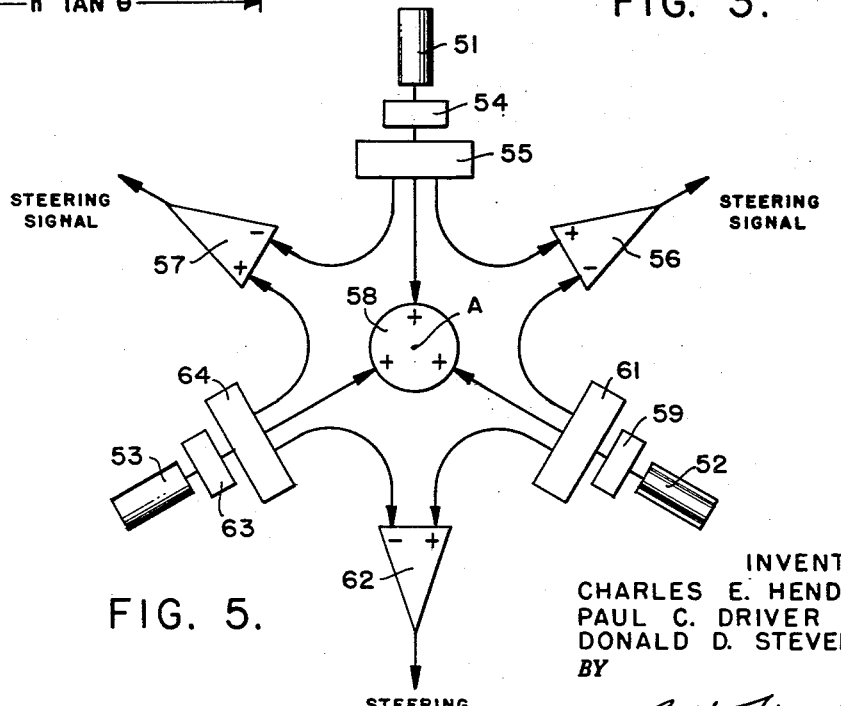

United States Patent Office 3,154,265
Patented Oct. 27, 1964

1

3,154,265
CONTROL SYSTEM FOR AUTOMATIC SOFT
LANDING OF A ROCKET VEHICLE
Charles E. Hendrix, Azusa, Paul C. Driver, China Lake,
and Donald D. Stevenson, Anaheim, Calif., assignors
to the United States of America as represented by the
Secretary of the Navy
Filed Apr. 19, 1962, Ser. No. 188,909
8 Claims. (Cl. 244—1)
(Granted under Title 35, U.S. Code (1952), sec. 266)

The invention herein described may be manufactured and used by or for the Government of the United States of America for governmental purposes without the payment of any royalties thereon or therefor.

The present invention relates to a system for controlling propulsion means; and more particularly to a control system for achieving automatic soft landing of a rocket-powered space vehicle on the surface of the moon or other planet.

In a proposed system, which is based on fixed thrust retro-rocket motors of the solid propellant type and in which the rocket motor is fired at a predetermined time, measurement of velocity and height at a considerable altitude and computing of the exact time of firing are required to bring the vehicle to zero height and zero velocity simultaneously. Obviously, such measurements must be extremely accurate as any error in the firing time would result in non-zero impact velocity. Successful use of such a system therefore imposes high accuracy requirements on the instrumentation as well as the knowledge of total impulse of the rocket motor; propulsion simplicity would thus be purchased at the expense of guidance complexity.

The control system of the present invention overcomes the disadvantages of the aforementioned proposed system by making use of a variable-thrust rocket motor and comprises an optical scanner which measures the ratio of the velocity of approach and height above the landing surface and then adjusts the thrust of the rocket motor so that this ratio is held constant, thus assuring that both velocity and height become zero simultaneously, which is the definition of a soft landing.

It is therefore an object of the present invention to provide optical means for controlling thrust to achieve a soft vertical landing.

Another object is the provision of a control system for controlling thrust of a rocket motor comprising means for comparing the output frequency of a photocell with an internal frequency standard, the difference between the two being the error signal required to control the thrust of the motor.

A further object is the provision of means for a programmed reference voltage for speeding up the landing maneuver.

Other objects, features and many of the attendant advantages of this invention will become readily appreciated as the same become better understood by reference of the following detailed description when considered in connection with the accompanying drawings wherein:

FIG. 3 is a diagram illustrating conditions when the thrust axis and velocity are not co-linear;

FIG. 4 is a block diagram of a control system for steering the vehicle in one plane;

FIG. 5 is a block diagram of a control system for three-dimensional steering; and FIG. 6 is a schematic illustrating the geometry involved in the generation of a frequency signal by the scanner.

2

Figure 1:
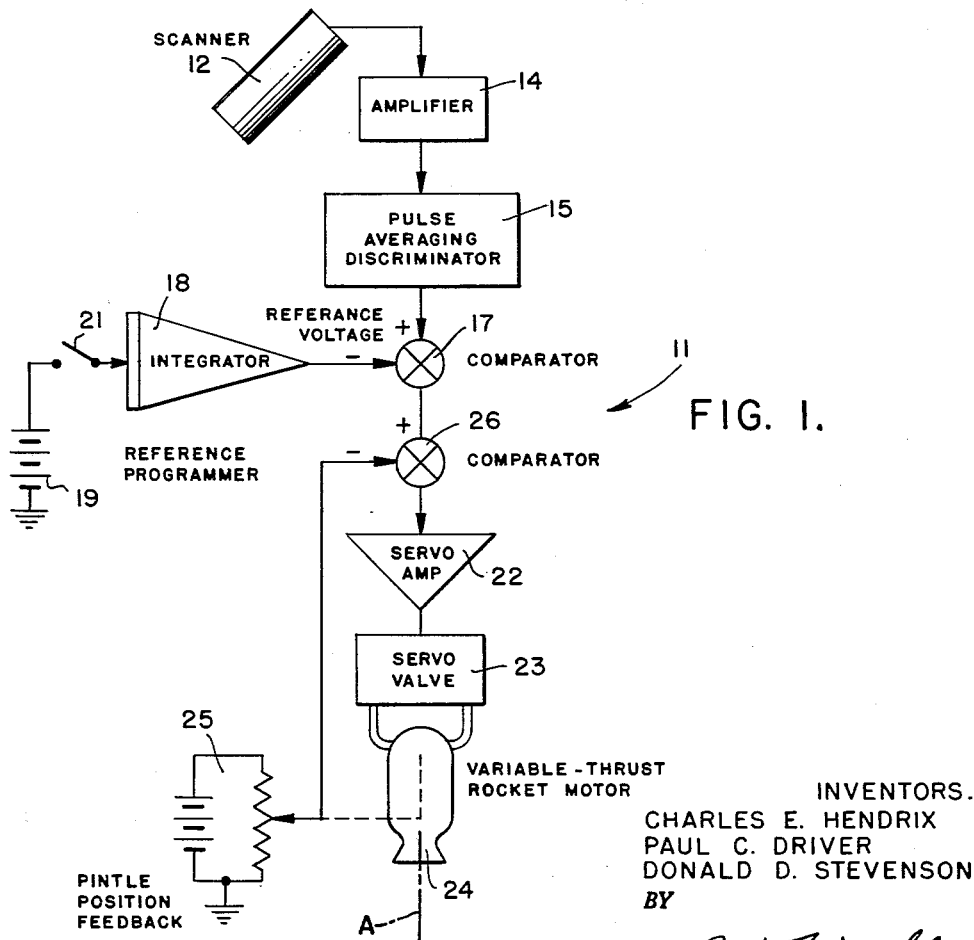
FIG. 1 is a block diagram of a control system embodying the invention.

Referring now to the drawings, wherein like reference characters are used throughout the drawings to refer to like or corresponding parts, there is shown in FIG. 1 a block diagram of a control system embodying the invention, the control system being generally designated by reference numeral 11. The control system comprises an optical scanner or sensor 12 the optical axis of which is inclined at some angle to the vehicle and thrust axis A so that the scanner scans to the side of the vehicle. The output of scanner 12, which is a frequency signal, passes to amplifier 14, and is fed to a pulse averaging discriminator 15 which generates a pulse of fixed amplitude and after amplification polarity for every cycle of its input signal and averages the pulses to provide an output which is a filtered or smoothed direct current voltage proportional to the incoming frequency. The output of discriminator 15 is passed to a comparator 17 for comparison with a reference voltage which taken with feedback voltage corresponding to the thrust of a rocket motor establishes the desired velocity to height ratio. As shown schematically in FIG. 1, the reference voltage is derived from a reference programmer comprising an analog integrator 18 which may be connected to a source of direct current voltage 19 by means of a switch 21 when reference programming is desired for purposes which will appear; however, other suitable references may be employed. Feedback voltage from pintle position feedback potentiometer 25 is fed back to a comparator 26 which receives the aforementioned discriminator output voltage and reference voltage, if any, the potentiometer being suitably connected to the pintle control of a variable-thrust rocket motor 24 which may be of the type shown and described in Astronautics, volume 4, No. 10 (October 1959), pages 40, 41, 80 and 81, or disclosed and claimed in patent applications Serial No. 18,773, filed March 30, 1960 (now Patent No. 3,074,231, issued January 22, 1963) and Serial No. 73,462, filed December 2, 1960 (now Patent No. 3,093,157, issued June 11, 1963). Any difference between the voltages results in an error signal which is amplified by a servo amplifier 22 and serves to directly control a hydraulic servo valve 23 which in turn displaces the pintle control of the variable-thrust rocket motor 24 to a position in which the feedback voltage is of a value that when compared with the voltage received from comparator 17 there is no longer any error. It will be appreciated that in the absence of a reference voltage from the integrator 18 the velocity to height ratio is governed by the discriminator output and feedback voltages.

Figure 2:
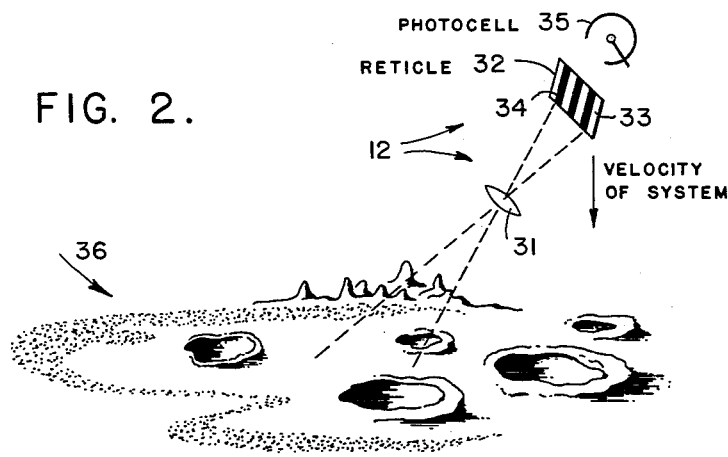
FIG. 2 is a schematic representation of the optical scanner of the control system.

Turning now to FIG. 2, there is schematically shown the optical scanner 12 which in its simplest form comprises an image forming lens 31, a reticle 32 comprised of alternate transparent and opaque bars 33 and 34, respectively, and a photo sensitive cell 35. Imaged on the reticle is the natural optical contrast of a landing surface 36 and as the vehicle moves toward this surface objects on the surface will appear to move radially outward and images of the objects on the surface will appear to move radially outward and images of the objects will move across the reticle. As an image moves across the reticle the light passing therethrough will vary in a cyclic manner and the light falling on the photocell will also vary in a cyclic manner so that the photocell output contains a frequency which is proportional to the apparent rate of image motion, this frequency being proportional to the angular rate of lines of sight to objects in the field of view. This frequency is independent of the size, shape, number or other characteristics of the objects; the only requirement in the generation of a signal is that there be optical contrast on the surface, which most natural surfaces provide.

FIGURE 6 illustrates schematically the geometry involved in the generation of a frequency by the scanner wherein the scanner is at a point H at a height $h$ vertically above point O on the landing surface 36 and sighting along line HP on a point P a radial distance OP from point O. With the axis of the scanner disposed at some angle $\theta$ to the vehicle and thrust axis, the radial distance OP is equal to $h \tan \theta$ and the sight line distance HP is equal to $h/\cos \theta$. If the scanner moves down an incremental distance $dh$, the apparent motion of point P is given by $dh \sin \theta$ and the change in angular position may be given as:

$$d\phi = \frac{dh \sin \theta}{h/\cos \theta}$$

Dividing by $dt$ and transposing yields:

$$\frac{d\phi}{dt} = \frac{dh/dt}{h} \sin \theta \cos \theta$$

It is thus seen that the scanner measures instantaneous values of velocity and height and that the scanner frequency, $f_s$, is proportional to the angular rate of change of the line of sight to some object in the field of view with rate of change of height, that is, the approach velocity, $v$, and the frequency may be stated as:

$$f_s = K \frac{v}{h}$$

where $v$ and $h$ are instantaneous values of velocity and height and K is the scanner or sensor constant.

The scanner or sensor constant is a coefficient which relates the output frequency to the input angular rate and is given by the product of the lens focal length and the number of bars per unit length in the reticle. For example, if the focal length is three inches, and the reticle has 100 bars per inch, then the sensor constant would be $3 \times 100$ or 300 cycles per radian, and with an input angular rate of one radian per second the scanner output frequency would be 300 cycles per second.

The selection of a value for the sensor constant must be guided by the angular rates to be expected which in any actual space mission will be low; probably in the order of 0.1 radian per second or less. In order to measure a frequency, which must be done in order to use the scanner output, it is necessary to average over a number of cycles, say 10–100. So that the averaging time may be kept to a minimum, it is desirable that the frequency range be as high as possible. These considerations indicate that although it will be limited by a number of factors, the sensor constant should be as large as possible. One such factor is the focal length of the lens which is somewhat limited by volume and weight considerations. With a given focal length, increasing the number of reticle bars per unit length will increase the sensor constant. However, a limit is reached when the blur circle of the lens becomes the same size as one transparent and one opaque bar. As a practical matter, it is well to keep the bar spacing about 10 times the blur circle diameter.

The control system described thus far is sufficient for a straight vertical descent of the vehicle; that is, when the thrust axis (and correspondingly the vehicle axis) and the velocity vector are co-linear, which is a necessary requirement to reduce all components of velocity to zero simultaneously. However, as seen in FIG. 3, with another scanner positoned to scan on the opposite side of the vehicle, then if the thrust axis and velocity vector are not co-linear, one of the scanners will generate an output with a higher frequency than the other scanner. This frequency difference may be used to generate a signal which controls the operation of attitude control means to steer the vehicle and bring the thrust axis and velocity vector into alignment.

A system for effecting steering in one plane is shown in FIG. 4 in which a pair of oppositely directed scanners 41, 42 are provided, the outputs thereof being fed through amplifiers 43, 44, respectively, to pulse averaging discriminators 45 and 46, respectively. The outputs of the discriminators 45, 46 are passed to differential amplifier 47 and summing amplifier 48. The amplifier 47 compares the inputs and if there is a frequency difference it generates a signal which can be applied to suitable torqueing devices, such as auxiliary jets or internal flywheels, to effect steering of the vehicle in the plane of the scanners. The amplifier 48 sums its inputs and generates a signal which is used to control a variable-thrust rocket motor after the manner of FIG. 1. By providing another pair of scanners disposed in a plane perpendicular to the plane of scanners 41, 42 steering can be achieved in three dimensions and the thrust axis can be brought into alignment with the velocity vector.

However, three scanners will suffice for three-dimensional steering by arranging the scanners about the thrust axis at intervals of 120 degrees. Turning to FIG. 5, scanners 51, 52 and 53 are shown arranged at intervals of 120 degrees about the thrust axis A. The output of scanner 51, after amplification by amplifier 54, is fed to pulse averaging discriminator 55, the output of which is passed to differential amplifiers 56 and 57 and summing amplifier 58. The output of scanner 52 is amplified by amplifier 59 and fed to pulse averaging discriminator 61, the output of which is passed to differential amplifiers 56 and 62 and summing amplifier 58. Likewise, the output of scanner 53, after amplification by amplifier 63, is fed to pulse averaging discriminator 64, the output of which is passed to differential amplifiers 57 and 62 and summing amplifier 58.

Thus, if the frequencies of the outputs of any two adjacent scanners are equal, there will be no error signal generated by the differential amplifier to which the outputs are passed. However, if there is a frequency difference a signal is generated which may be applied to suitable torqueing means for steering the vehicle to a generally vertical altitude and aligning the thrust axis with the velocity vector after which the vehicle will land normal to the surface. The output of amplifier 58 is applied to the variable-thrust rocket motor for controlling the rate of descent of the vehicle.

Suitable provision is made, of course, for starting the landing maneuver with the vehicle in such an attitude that all the scanners can "see" the landing surface and with substantially no angular momentum. Such a system might involve a gyro-stabilized platform or a method of unwinding weighted cords or make use of further optical means sensing the sun as a reference. Or the vehicle could be discharged from a space ship in the proper attitude. However, such means form no part of the present invention and will not be discussed further.

The capabilities of any space vehicle will have certain limitations, the most important of which are thrust, which cannot exceed some maximum, and fuel capacity, which limits total impulse. Use of the control system with switch 21 open, that is, with no reference voltage programmed into the system and in which only the discriminator output and feedback voltages are compared and the measured variable is the velocity-to-height ratio and equals a constant, results in an exponentially asymptotic approach to the landing surface, theoretically requiring an infinite amount of time to descend and thereby extending the landing maneuver time with attendant high requirement for fuel. As a practical matter, the scanner will be mounted above the lower end of the vehicle, and the denominator of the ratio will not go to zero at the instant of touching down on the landing surface, but will remain at some height above it. This means that the vehicle will impact with some slight velocity that can be tolerated by the vehicle and its contents. Even so the fuel expenditure will be high. Employment of suitable means, such as means 18, 19 and 21 of FIG. 1, to program an increasing reference voltage into the control system so that the velocity-to-height ratio equals some montonically increasing function of time, results in a more rapid descent of the vehicle and an attendant reduction in fuel expenditure to a more economical figure. Suitable provision could be made for connecting the integrator 18 to the voltage source 19 at initiation height as by use of a barometric switch or triggering and gating circuitry (not shown).

There has thus been provided a control system for automatic soft landing of a rocket vehicle. Obviously many modifications and variations of the present invention are possible in the light of the above teachings. It is therefore to be understood that within the scope of the appended claims the invention may be practiced otherwise than as specifically described.

What is claimed is:

1. A system for automatic soft landing of a vehicle on a surface, comprising in combination, a rocket motor on said vehicle capable of upward thrust, optical means for scanning said surface and generating a frequency, means for generating a reference frequency, means for comparing said scanner frequency with said reference frequency, and means responsive to said comparison for adjusting the thrust of said motor for landing said vehicle on said surface.

2. The system as in claim 1, wherein said reference frequency is varied for effecting a more rapid descent in the later stages of the landing of the vehicle.

3. A system for controlling vertical landing of a vehicle on a surface, comprising in combination, a variable-thrust rocket motor on said vehicle for imparting upward thrust thereto, optical means for scanning said surface, said means including a reticle and a photocell and generating a frequency proportional to the ratio of velocity to height, means for generating a reference frequency, means for comparing said scanner frequency with said reference frequency, control means for said motor, said control means being responsive to differences in said scanner and reference frequencies for adjusting the thrust of said motor to maintain the velocity to height ratio constant.

4. The system as in claim 3, further characterized in that a programming means is arranged to apply a reference voltage to the system to vary said velocity to height ratio from small values in the early stages of the landing to increased values in later stages of the landing for effecting a more rapid descent of the vehicle.

5. A system for soft landing of a rocket vehicle on a surface, comprising in combination, a rocket motor on said vehicle for imparting axial thrust thereto, a plurality of scanners carried by said vehicle and disposed to scan to opposite sides of the vehicle, each of said scanners generating a frequency in response to movement of said vehicle relative to a landing surface, the outputs of said scanners being passed to a differential amplifier and to a summing amplifier, the output of said differential amplifier providing a steering signal, and the output from said summing amplifier providing a motor thrust control signal.

6. A system for soft landing of a vehicle having attitude control means and a rocket thrust motor, comprising in combination, a plurality of scanners arranged on said vehicle equi-angularly about the axis of thrust of said motor, each of said scanners generating a frequency in response to movement of said vehicle toward a landing surface, a plurality of differential amplifiers equal in number to said scanners with a pair of amplifiers associated with each of said scanners respectively, a summing amplifier, the output of each scanner being passed to said summing amplifier and to the associated pair of differential amplifiers respectively, the output of said summing amplifier providing a signal for control of the thrust of said motor, and the outputs of said differential amplifiers providing steering signals for the attitude control means.

7. A system for soft landing of a vehicle on a surface, comprising in combination, a variable-thrust rocket on said vehicle arranged to impart upward thrust thereto, scanning means on said vehicle adapted to generate a signal in response to movement of said vehicle relative to said surface, discriminating means receiving said scanner signal and passing it to a comparator, means for generating a reference signal and passing it to said comparator, means for controlling the thrust of said motor including servo means and a pintle control, and means for receiving the signal output of said comparator and passing it to said servo means.

8. The system of claim 7, in which said means for generating a reference signal comprises feedback voltage means associated with said pintle control.

References Cited in the file of this patent

UNITED STATES PATENTS 2,945,649   Metcalf ---------------- July 19, 1960